US010796335B2

(12) United States Patent
He et al.

(10) Patent No.: US 10,796,335 B2
(45) Date of Patent: Oct. 6, 2020

(54) DEVICE, METHOD, AND COMPUTER READABLE MEDIUM OF GENERATING RECOMMENDATIONS VIA ENSEMBLE MULTI-ARM BANDIT WITH AN LPBOOST

(71) Applicant: SAMSUNG SDS AMERICA, INC., Ridgefield Park, NJ (US)

(72) Inventors: Qing He, San Jose, CA (US); Abhishek Mishra, San Jose, CA (US); Zhisu Zhu, San Jose, CA (US)

(73) Assignee: SAMSUNG SDS AMERICA, INC., Ridgefield Park, NJ (US)

( * ) Notice: Subject to any disclaimer, the term of this patent is extended or adjusted under 35 U.S.C. 154(b) by 724 days.

(21) Appl. No.: 15/290,605

(22) Filed: Oct. 11, 2016

(65) Prior Publication Data

US 2017/0103413 A1 Apr. 13, 2017

Related U.S. Application Data

(60) Provisional application No. 62/238,809, filed on Oct. 8, 2015.

(51) Int. Cl.
*G06Q 30/02* (2012.01)

(52) U.S. Cl.
CPC ................................ *G06Q 30/0244* (2013.01)

(58) Field of Classification Search
USPC ........................................................ 705/14.1
See application file for complete search history.

(56) References Cited

U.S. PATENT DOCUMENTS

2015/0154672 A1* 6/2015 Liptay ................ G06Q 30/0605 705/26.2

* cited by examiner

*Primary Examiner* — Afaf Osman Bilal Ahmed
(74) *Attorney, Agent, or Firm* — Sughrue Mion, PLLC

(57) ABSTRACT

A method, an apparatus, and a computer readable medium of recommending contents. The method includes receiving, by a computer, at least one of user input and contextual input, wherein the contextual input corresponds to a plurality of arms, calculating, by the computer, a plurality of reward values for each of the plurality of arms using a plurality of individual recommendation algorithms such that each of the plurality of reward values is generated by a respective individual recommendation algorithm from the plurality of individual recommendation algorithms, based on the received input, calculating, by the computer, an aggregated reward value for each of the plurality of arms by applying linear program boosting to the plurality reward values for the respective arm; and selecting one arm from the plurality of arms which has greatest calculated aggregated reward value; and outputting, by the computer, contents corresponding to the selected arm.

17 Claims, 4 Drawing Sheets

DEVICE, METHOD, AND COMPUTER READABLE MEDIUM OF GENERATING RECOMMENDATIONS VIA ENSEMBLE MULTI-ARM BANDIT WITH AN LPBOOST

CROSS-REFERENCE TO RELATED APPLICATION

This application claims priority under 35 U.S.C. § 120 to U.S. Provisional Application No. 62/238,809, filed on Oct. 8, 2015, titled "ENSEMBLE MULTI-ARM CONTEXTUAL BANDIT METHOD VIA LPBOOST FOR ONLINE PERSONALIZED RECOMMENDATION, the disclosure of which is incorporated herein by reference in its entirety.

BACKGROUND

Field of Invention

Exemplary embodiments broadly relate to content recommendations, and more specifically, to a device, a computer readable medium, and a method of personalized recommendations in an online environment such as optimizing click through rate.

Description of Related Art

Amounts of information available on the Internet exponentially increase. Also, the variety of user devices used for obtaining information from the Internet increases. With the wide use of mobile devices, the display space is limited and amounts of information to be presented are also limited. Accordingly, it is desirable to present most relevant information to the user and to customize or personalize the presented information as much as possible. At least one parameter used to evaluate the relevance of information presented to the user is called a "click through rate". For example, it evaluates a number of times presented information was selected by the users divided by a number of times the information was presented to the user. It is desirable to improve the click through rate.

A number of techniques are available for presenting most relevant information to the user. Additionally, a reward system may be instituted in which a reward is provided for each recommendation accepted or clicked on by the user.

To improve on relevance of selecting online information or online recommendation contents such as online advertisements, many techniques are used that take into account user preferences, use history, and so on. One common technique is multi-arm bandit method, in which the system attempts to learn user preferences from user responses and adjusts further responses accordingly. There are a wide variety of multi-arm bandit algorithms where some focus on exploration (recommending new categories based on already known user preferences), while others focus on exploitation (selecting categories already known to be preferred by the user), while yet other algorithms provide a balance between these two or a combination of these two.

The performance of different individual algorithms varies significantly in various recommendation applications. No individual algorithm shows robust performance to all environments. In other words, a technique is needed which would select from among various different algorithms based on a variety of factors such as the environment in which the technique is applied.

Additionally, each individual algorithm is required to find an appropriate tuning parameter to balance between an exploitation technique and an exploration technique. The optimal value of tuning parameter is hard to be located; however, it will significantly influence the performance of the recommendation with regards to achieving satisfactory return.

In an online setting, the environment can continuously change overtime. For an individual algorithm, even if it performs well for some period, it is hard for any individual algorithm with fixed tuning parameters to maintain demonstrating good performance for the long run.

For a cold-start situation with limited data sources (e.g., where a user is new and is unknown to the system), it is often difficult to conduct any unbiased offline evaluation due to the deficiency of historical data to either 1) pick one appropriate recommendation algorithm, or 2) to find appropriate tuning parameter for a given recommendation algorithm.

In related-art, there is very limited research on ensemble contextual bandits. There is a need in the art to provide a technique that would be able to select an optimal algorithm and an optimal parameter based on a variety of factors such as the environment and/or combine techniques as necessary.

SUMMARY

An aspect of one or more exemplary embodiments is to learn an optimal exploitation and exploration balance from the data instead of relying on human intervention. Another aspect of one or more exemplary embodiments is to find an optimal combination of possible basic bandit algorithms to achieve optimal return in the long run. Yet another aspect of one or more exemplary embodiments is to provide robust recommendation performance in different environments and recommendation topics. Yet another aspect of one or more exemplary embodiments is to provide robust recommendation performance under time-varying environment, improve the performance of initial recommendation even with insufficient data especially in a cold-start recommendation problem, or when new users start to show significantly different behavior patterns. Provide an optimal selection for a recommendation system with continuous rewards, in addition to Bernoulli reward.

Illustrative, non-limiting embodiments may overcome the above disadvantages and other disadvantages not described above. Also, one or more exemplary embodiments are not necessarily required to overcome any of the disadvantages described above, and an illustrative, non-limiting embodiment may not overcome any of the problems described above. The appended claims should be consulted to ascertain the true scope of an inventive concept.

An apparatus, a computer readable medium, and a method of recommending contents. The method of recommending contents includes receiving at least one of user input and contextual input, where the contextual input corresponds to a plurality of arms, calculating a plurality of reward values for each of the plurality of arms using a plurality of individual recommendation algorithms such that each of the plurality of reward values is generated by a respective individual recommendation algorithm from the plurality of individual recommendation algorithms, based on the received input, calculating an aggregated reward value for each of the plurality of arms by applying linear program boosting to the plurality reward values for the respective arm; and selecting one arm from the plurality of arms which has greatest calculated aggregated reward value. The contents corresponding to the selected arm is output, for example on a display.

BRIEF DESCRIPTION OF DRAWINGS

The above and other aspects may become more apparent by describing in detail illustrative, non-limiting embodiments thereof with reference to the accompanying drawings, in which.

DETAILED DESCRIPTION OF EXEMPLARY EMBODIMENTS

Figure 1:
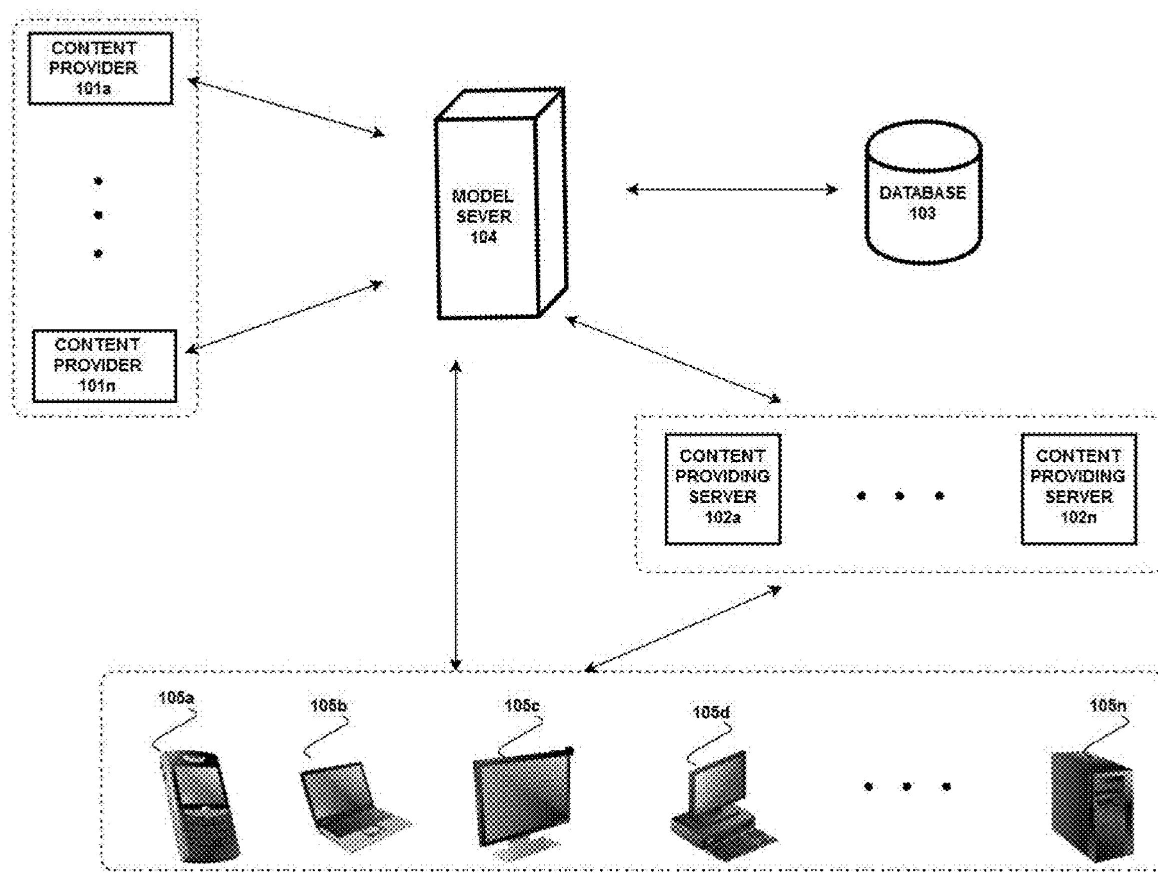
FIG. 1 is a block diagram illustrating a system of providing recommended content according to an exemplary embodiment.

Exemplary embodiments will now be described in detail with reference to the accompanying drawings. Exemplary embodiments may be embodied in many different forms and should not be construed as being limited to the illustrative exemplary embodiments set forth herein. Rather, the exemplary embodiments are provided so that this disclosure will be thorough and complete, and will fully convey the illustrative concept to those skilled in the art. Also, well-known functions or constructions may be omitted to provide a clear and concise description of exemplary embodiments. The claims and their equivalents should be consulted to ascertain the true scope of an inventive concept.

In an exemplary embodiment, an ensemble contextual multi-arm bandit method using linear program boosting to find optimal combination of existing methods, in order to improve long term reward of decision making/strategy selection through finding optimal combination of exiting methods. In additional to the ensemble recommendation method, one or more exemplary embodiments may provide:

1) an LPBoost algorithm of the ensemble recommendation method for solving large scale problem,
2) an efficient LPBoost algorithm in the online learning scenario, and
3) a parallel computational structure for efficient implementation of the ensemble recommendation engine.

For example, a personalized recommendation system is usually formulated as a multi-armed bandit problem with context information. The recommendation engine may proceed in the following discrete trails t=1, 2, 3, . . . . In trail t, 1) A new user, $u_t$, comes into the system. Denoted by $A_t$ the set of arms (article, news, strategies) the user may choose. For each arm $a \in A_t$, denoted by $x_t^a$ the feature vector containing information of both the user $u_t$ and arm a. $x_t^a$ is referred as the context that can be used to predict the reward by arm a to user $u_t$.

2) Based on the arm selection algorithm trained till the previous trial, an expected reward $r_t^a$ for each arm $a \in A_t$ is calculated. Based on $\{r_t^a: a \in A_t\}$, an arm a* is picked by the arm selection algorithm and is recommended to the user.

3) An action is taken by the user corresponding to the recommended arm a* with an actual reward $y_t^{a*}$ observed. The algorithm then improves its arm-selection strategy with the updated new observation ($x_t^{a*}$, a*, $y_t^{a*}$). Note that the new observation only influence the reward prediction by the arm selection engine for arm a*.

Commonly, the reward may be defined as follows:

$y_t^{a*}=1$, when a user accept recommendation at time t 0, when a user deny recommendation at time t However, it is not limited thereto. In an exemplary embodiment, a method described hereinafter may also be used for an online recommendation with continuous rewards.

Generally, a recommendation engine is to train the arm selection algorithm used in STEP Two and Three described above so that the expected T trail reward, $[\Sigma_{t=1}^{T} r_{t,a_t}]$, can be maximized, where $a_t$ represents the arm selected in trail t by the algorithm. Equivalently, the algorithm aims to maximize the click through rate (CTR) based on the reward definition above, or any continuous rewards scenario. To achieve this aspect, an arm selection algorithm in an online changing environment targets for a balance between exploitation and exploration. For exploitation, an algorithm relies on its past experience to recommend the optimal arm that leads to maximum predicted reward. For exploration, instead of recommending the arm with maximum reward based on historical information, an algorithm creates randomness to obtain users' feedback to various recommendation solutions so as to improve the algorithm training. Over exploitation will cause the system not to be able to adapt to the continuously changing online environment so as to reduce long term expected reward. Over exploration will cause the system not sufficiently take advantage of the existing information for best arm recommendation so that limit the short term reward.

The existing contextual bandit algorithms may provide different contextual-reward models, different sampling methods, various arm selection strategies, and different exploration-exploitation trade off solutions in order to achieve the goal to maximize the expected reward.

For example, a list of different multi-arm bandit algorithms by categories are described below. However, the list below is provided by way of an example only and not by way of a limitation. One or more exemplary embodiment may incorporate any bandit algorithm as a basic learner and apply the LPBoost recommendation method, which is described in greater detail below. The selection of a basic learner is not limited by the following list and is provided by way of an example only.

1. Category—Unguided Exploration

A) ε-greedy method: randomly select an arm with probability ε, and select the arm of the largest predicted reward with probability 1−ε.

B) Epoch-greedy method: run exploration/exploitation in epochs of length L, in which one step of exploration is first performed, followed by exploitation in the rest trials before starting the next epoch.

2. Category—Guided Exploration

A) Linear model:

LinUCB (α): use linear regression to model reward given contextual features. Select an arm with the largest score, which is calculates the estimated mean and variance of the reward with parameter a controls the balance of exploration and exploitation.

LinTS($q_0$): use linear regression to model reward given contextual features. Use Thompson sampling to draw coefficients from posterior distribution and select the arm with largest sampled reward. The parameter $q_0$ is in the prior distribution to control exploration/exploitation B) Logistic model:

LogisticUCB (α): similar to LinUCB (α) but use logistic regression to model reward given contextual features.

LogisticTS ($q_0$): similar to LinTS($q_0$) but use logistic regression to model reward given contextual features.

LogisticTSNR ($q_0$): similar to LogisticTS ($q_0$), but in the stochastic gradient ascent, there is no regularization by the prior.

BoostrapLogisticTS ($q_0$): similar to LogisticTS ($q_0$) but use bootstrap method instead of draw random sample from posterior distribution.

C) Probit Model:

ProbitUCB($\alpha$): similar to LinUCB ($\alpha$) but use generalized linear regression with probit link function to model reward given contextual features.

ProbitTS($q_0$): similar to LinTS($q_0$) but use generalized linear regression with probit link function to model reward given contextual features.

BoostrapProbitTS ($q_0$): similar to ProbitTS ($q_0$) but use bootstrap method instead of draw random sample from posterior distribution.

A hyper bandit over the base bandits may be used but the hyper bandit is only able to select one of the basic bandit algorithms instead of finding optimal combination of all basic bandits.

In an exemplary embodiment, a method is adopted to learn an optimal exploitation and exploration balance for the data instead of relying on human intervention, as explained in greater detail below.

FIG. 1 is a block diagram illustrating a system of providing recommended content according to an exemplary embodiment. In FIG. 1, user terminals 105*a* . . . 105*n* are provided. For example, the user terminal may be a mobile terminal 105*a*, a laptop or a personal notebook 105*b*, a television 105*c*, and/or a personal computer 105*d*. A user terminal may include a user input device such as a keyboard, mouse, joystick, remote controller, and/or a touch screen. The user terminal may further include an output interface such as a display and/or a printer configured to display results and the recommended contents. The user terminal may further include a memory and a processor configured to process user input and control the user terminal to display the corresponding output among other functions, as is known in the art. The user terminal may include a communicator configured to transmit and receive user input and output. A communicator may include a network card, a modem, and so on.

The user terminals 105*a* . . . 105*n* communicate with content providing servers 102*a* . . . 102*n*, which are configured to process and provide content to user terminals including but not limited to recommended content, advertisements, and so on. The contents may be video, images, text and or any combination of the same.

The system further includes, according to an exemplary embodiment, a model server 104, which may be one server or a plurality of servers, which are configured to retrieve various exploration and exploitation algorithms from a database 103 (which may be a plurality of databases 103) and historical data from the database 103 and/or one or more user terminals 105*a* . . . 105*n*. The model server 104 is further configured to optimize weights for different algorithms and apply LPBoost to each arm (result of each algorithm), apply E-greedy probability approach (optionally) and come up with an arm with the best score and based on that determine contents or select/recommend most appropriate content, as explained in greater detail below.

Based on the selected arm, contents to recommend are obtained from one of the content provider servers 101*a* to 101*n* and are provided to a respective user terminal 105*a* . . . 105*n*. Based on user interaction or lack thereof with the provided contents, rewards information (positive if selected, none if ignored) is provided back to the model server 104 for further updates of a model used to select rewards. In an exemplary embodiment, the exemplary servers, database, and user terminals communicate with each other via one or more networks such as Internet, Intranet, personal network, Wi-Fi, and so on.

Unlike the related art, where input to the basic learner algorithm is fixed. In an exemplary embodiment, input may be a combination of elements obtained from different sources. For example, different inputs maybe used for different basic learner algorithm. The input may include but is not limited to demographic information, geographic information, and product information. Any combination of these inputs may be obtained for various basic learner algorithm. In an exemplary embodiment, basic learner algorithms receive different inputs and/or type of inputs may vary based on iteration, date, and so on. Results of the algorithms are optimized using LP Boost such that optimized weights are assigned to each content based on basic learner algorithms. Accordingly, the content that is most likely to receive the highest reward is selected and provided to the user. The contents may include an advertisement of a particular product, location, a recommendation of video contents, and so on. The contents may include a music recommendation, a particular audio clip recommendation, and so on. These contents are provided by way of an example only and not by way of a limitation.

Figure 2:
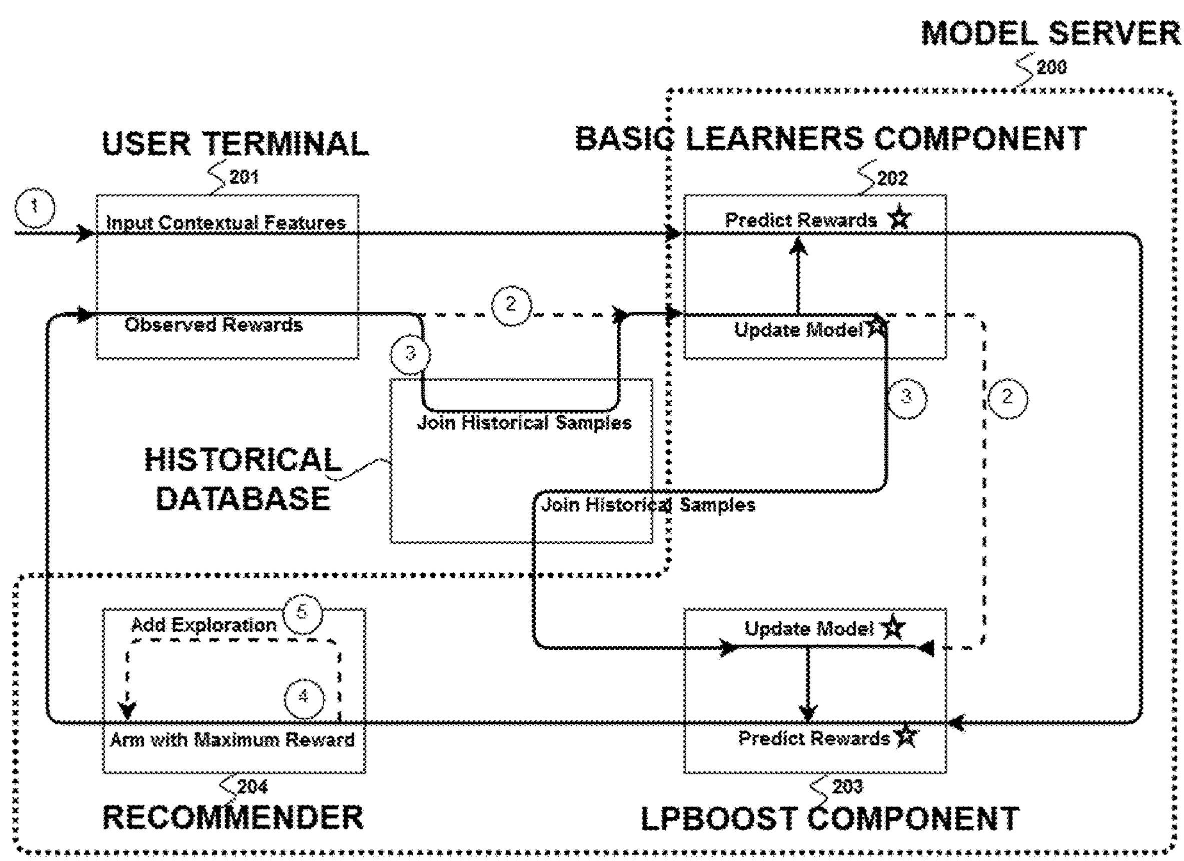
FIG. 2 is a flow diagram illustrating a method of selecting contents according to an exemplary embodiment.

FIG. 2 is a flow diagram illustrating a method of selecting content according to an exemplary embodiment.

As shown in FIG. 2, a user terminal 201 displays contents and receives user input. In an exemplary embodiment, based on whether the user hovers over or perhaps clicks on the displayed contents, rewards may be observed, operation 1 (observed rewards). In an exemplary embodiment, the system can choose from updating input by each user individually. User input may be accumulated and provided in a batch. The batch size may be flexible. The model server 200 has a basic learners component 202, an LPBoost component 203, and a recommender 205. The basic learners component 202 receives contextual features input by the user, which for example, may include a particular category of content that is being viewed by a user, and receives observed rewards.

The input contextual features may include product information, attributes, and/or characteristics. Depending on the similarity of current input features and observed rewards and those from historical data, the system choose from use the current information only or combined with historical information. Whether to discard or incorporate historical information can be decided by a statistical hypothesis test. The input contextual features may be provided from a contextual knowledge database which stores information about various contents and may be included in history data database 204 or may be received via user input. In an exemplary embodiment, the observed rewards are provided to a memory. The observed rewards may include user interaction with displayed content. The observed reward may be user reaction (hover over, click on) with the provided contents. If the user ignored the reward or moved to a different page during the display of the provided contents, the reward may be categorized as a negative reward. On the other hand, if the user viewed the contents, showed interest in the content, the observed reward may be categorized as a positive reward.

In an exemplary embodiment, depending on user involvement with the provided contents, different level of rewards may be provided. By way of an example, a positive 1 may be assigned as rewards if the user hoovers over the provided contents, a positive 2 may be assigned as rewards if the user clicks on the provided contents, a positive 3 may be assigned as rewards if the user watches the entire provided contents, and a positive 4 may be assigned as rewards if the user proceeds to purchase the advertised product in the contents. In an exemplary embodiment, different levels of rewards may be provided, which may be positive and negative. The different levels may be hierarchically assigned based on user interaction with the contents. This is provided by way of an example only and not by way of a limitation.

The memory stores the observed rewards and contextual features and may include a plurality of databases such as knowledge database and statistical data categorized by group of users, individual user, and so on. By way of an example, historical samples are stored in a history data database 204. User inputs are provided via a network from the user device, from content providing servers, and/or from the model server 200 to the history data database 204. User inputs are applied to update historical samples stored in the history data database 204 and may be categorized by a particular user and/or a group of users. The history data database 204 may also store a user profile and/or group profiles, user historical preferences for each user and/or groups, and so on.

The basic learners component 202 applies a statistical hypotheses test to determine the strategy to use historical data in operations 2 and 3. The basic learners component 202 may use the updated historical samples and apply them to a number of possible arms, where each arm may represent contents or type of contents to be provided to a user. By way of an example, one arm may represent an advertisement image of a yogurt, another arm may represent an advertisement video of milk, another arm may represent an audio clip advertisement for bread. By way of another example, all arms may represent advertisements of one product but each arm may represent different format for the advertisement e.g., one arm an image advertising the product, another arm a video advertising the product, another arm another video advertising the product, and another arm an audio clip advertising the product. These examples are for illustrative purposes only and are not intended to limit exemplary embodiments.

In an exemplary embodiment, the basic learners component 202 applies different algorithms to come up with an optimal model for each arm and predict rewards for each arm (particular type of contents to select for a recommendation). Because of changing environment, different basic learners may be appropriate and suitable. Each basic learner algorithm in the basic learners component 202 may be weak by itself. In an exemplary embodiment, various basic learner algorithms are combined to provide a more robust solution for a changing environment.

For example, each model may be updated for each of a plurality of arms in parallel in the basic learners component 202, based on the updated historical samples and input contextual features. Using the updated model, rewards for each arm are then predicted. In an exemplary embodiment, user input may be observed to determine if a statistically significant change has occurred to update the historical samples applied to basic learners in the basic learner component 202. That is, in an exemplary embodiment, the basic learner component may update its model each time there is a significant change in the environment e.g., the user is no longer interested in food and now only views sports. As shown in FIG. 2, if the observed rewards are not statistically different, then historical samples from the history data database may be provided to the basic learner component 202. On the other hand, if the observed rewards are statistically different, then the historical data in the history data base 204 is updated and the observed rewards are also provided to the basic learner component 202.

To optimize parameters for each arm, LP Boost may be applied by the LP Boost component 203, explained in greater detail below with reference to FIG. 3. When the lists of basic learners are sufficient to cover choice of exploitation and exploration balance, then arm with maximum rewards is used where the arm with the maximum predict rewards is recommended, in operation 4. When the basic learners are not sufficient, exploration contents is used where another ε-greedy method can be used for arm recommendation. In other words, in a selector or a recommender 205, an optimal arm is selected (4) and based on whether the optimal arm is sufficient, the optimal arm is used to suggest or recommend contents. If the optimal arm is not sufficient, then contents obtains via exploration is recommended by the recommender 205.

In an exemplary embodiment, the recommender 205 is depicted as part of the model server 200. However, this is provided by way of an example only and not by way of a limitation. The recommender 205 may be a separate component such as a content providing server. Additionally, the basic learner component 202 and the LPBoost component 203 may be separate components such as separate servers. The components of the model server 200 may be implemented via cloud computing. The recommender 205 may compare the arm with an optimal arm (arm with the maximum reward) to a predetermined threshold or apply an algorithm to determine whether the optimal arm is statistically probable to yield a positive reward. The recommender 205 may determine that it is better to explore a new category, recommend new contents, as opposed to providing the arm with maximum reward, in operations 4 and 5.

FIG. 2 is a flow diagram illustrating an online implementation of LPBoost recommendation engine. The process is running iteratively with a continuous online design. For initialization, LPBoost component 203 may set equal weights to all basic learners in the Basic Learner component 202. As the model server 200, which may be considered a recommendation engine, collects more samples, the parameters in the basic learners of the Basic Learner components 202 and the weights in LPBoost Component 203 will keep updating accordingly. In an exemplary embodiment, the parameters input in the basic learners and/or the weights may be updated continuously, on the fly, in real time. In yet another exemplary embodiment, the parameters input in the basic learners and/or the weights may be updated at predetermined intervals or updating may be triggered by changing environment. In yet another exemplary embodiment, different input parameters may be input into different basic learners. As such, different basic learners may be updated at different times.

The online LPBoost recommendation engine (such as the model server 200) executes two processes according to an exemplary embodiment. The first process is to provide a recommendation for new users: when a new user arrives with contextual features, it is first sent to basic learners in the basic learner component 202 (such as multi-arm bandit algorithms described above) to get the preliminary predicted rewards for each arm based on current model parameters. Then, the reward prediction from basic learners are collected and sent to the LPBoost Component 203 to calculate the ensembled rewards for each arm based on current values of the weight parameters. The arm with the maximum LPBoost predicted reward is provided to the recommender 205 to be recommended to the user or to be statistically analyzed with a possible exploration technique.

In an exemplary embodiment, the model server 200 continues to train the models with updated samples: after a recommendation is made by the LPBoost Component 203, the online system gets a feedback information from the user regarding whether the user will accept the recommendation or not. Then the new sample can be added to historical samples in the history data database 204 and provided to the Basic Learner component 202 used to update the model parameters in all basic learners. Based on the updated basic learners and updated samples, the LPBoost method of the LPBoost component 203 will re-learn the weighting parameters for all basic learners and update the model. The updated basic learners and LPBoost are to be used as current model to make recommendation for any new users.

Figure 3:
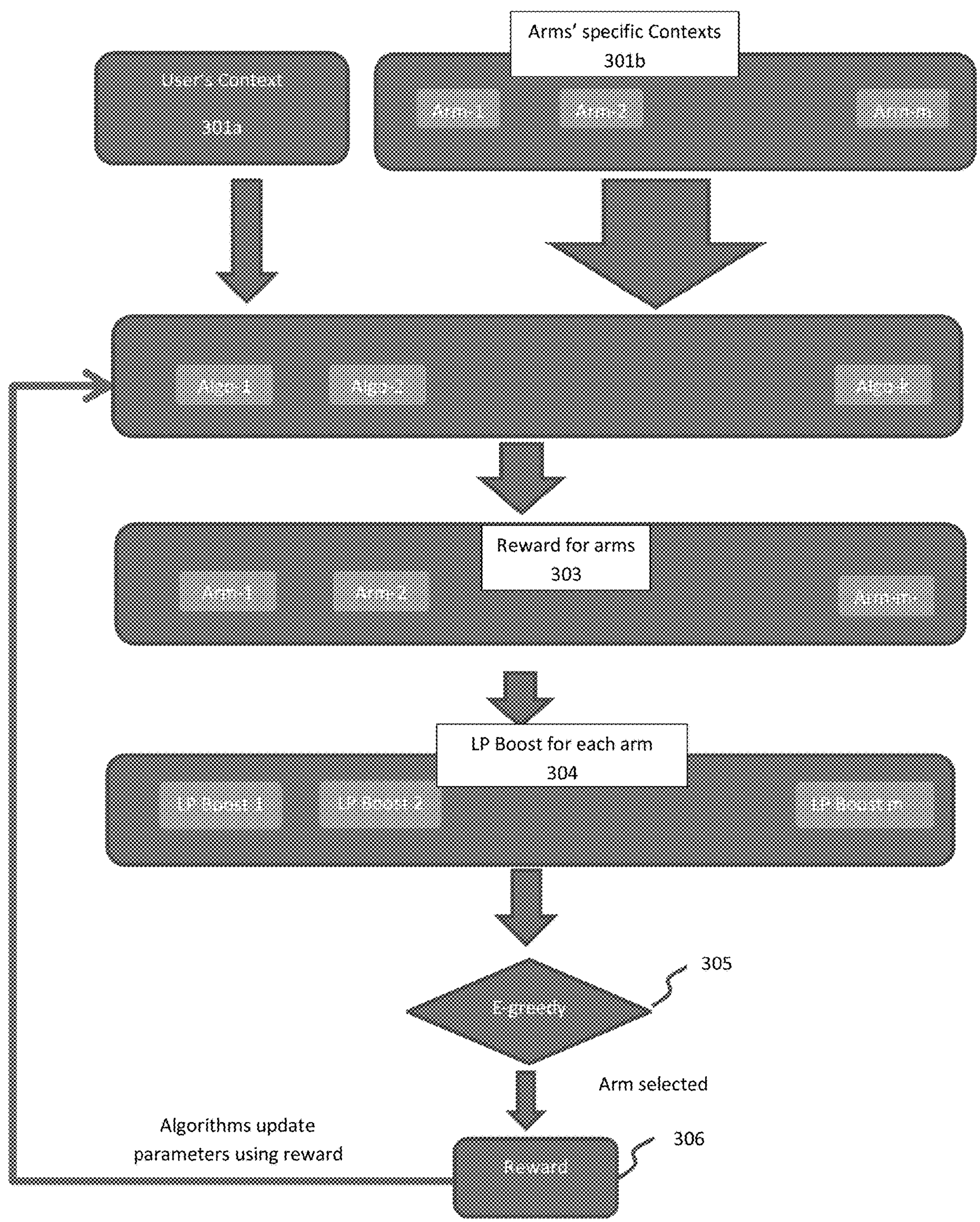
FIG. 3 is a flow chart illustrating a method of recommending contents according to an exemplary embodiment.

FIG. 3 is a flow chart illustrating a method of recommending contents according to an exemplary embodiment.

FIG. 3 illustrates a Linear Programming Boosting (LPBoost), according to an exemplary embodiment, which is a supervised classifier from the boosting family of classifiers. LPBoost is an ensemble method to build a linear combination of basic classifiers. The weights for each basic classifier are designed to maximize the margin between training samples of different classes. The LPBoost method is applied in a personalized recommendation setting. Given that the performance of different recommendation algorithms vary in different recommendation applications, the use of LPBoost is adapted as an ensemble that outperforms each single basic algorithm resulting in a better recommendation performance.

As shown in FIG. 3, in operation 301*a*, user's context is received and in operation 301*b*, a plurality of arms, Arm-1, Arm-2, . . . , Arm-m, specific contexts are received. By way of an example, user's context received in operation 301*a* may include user preferences, user profile, and historical samples (e.g., which arms or categories received which rewards). Arm's specific contexts 301*b* may include characteristics and attributes of a product or a particular content that is to be recommended to a user.

In FIG. 3, in operation 302, the received inputs (user's context and arm specific contexts) are applied to each of the plurality of algorithms Algo-1, Algo-2 . . . Algo-k. These algorithms, each processes the received inputs independently from one another to come up with an optimal arm. Each algorithm will produce a score for each of the arms input in operation 301*b*.

According to an exemplary embodiment, the plurality of algorithms are basic learner algorithms which optimize rewards i.e., select and/or recommend contents to be displayed to the user. In an exemplary embodiment, the plurality of algorithms may include but are not limited to basic learner algorithms described above. Other than the contextual methods listed above can be used as basic learners. For example, other basic learners may be appropriate non-contextual bandit approaches, multi-arm contextual bandit approaches with different tuning parameters e.g., the a parameter in the above UCB approaches and $q_0$ parameter in Thompson approaches, and other possible bandit approaches with reward estimation for each arm. As shown in FIG. 3, in operation 303, rewards for each arm is calculated by each of the plurality of algorithms, rewards for Arm-1, Arm-2, . . . , Arm-m-k.

According to an exemplary embodiment, a score produced by each algorithm for each arm is averaged out or combined together to come up with a predicted reward for each arm. The recommendation engine or the model server can apply the LPBoost method, in operation 304, to learn optimal values for the weights of basic algorithms so that the expected reward can be maximized, LP Boost 1, LP Boost 2, . . . , LP Boost m. In operation 304, optimal weight for each algorithm (algo-1, algo-2, . . . algo-k) are determined. These optimal weights are then used to combine the scores produced by each algorithm for each arm in operation 303. That is, in an exemplary embodiment, each algorithms (algo-1, algo-2, . . . algo-k) produce a rewards for each arm (Arm-1, Arm-2, . . . Arm-m) independently. Next, in operation 304, different weights are applied to rewards produced by different algorithms for a particular arm, and the particular arm rewards is obtained. This is repeated for each arm to obtain optimal rewards value by using multiple algorithms.

In operation 305, E-greedy algorithm is applied to determine whether to proceed with an arm with the highest reward or to select a new arm (category). In other words, in operation 305, a determination is made whether to select an arm with an optimal reward or to select a new arm (exploration). In operation 306, rewards are obtained by displaying the selected arm. These rewards are then fed back to the algorithms in operation 302.

Figure 4:
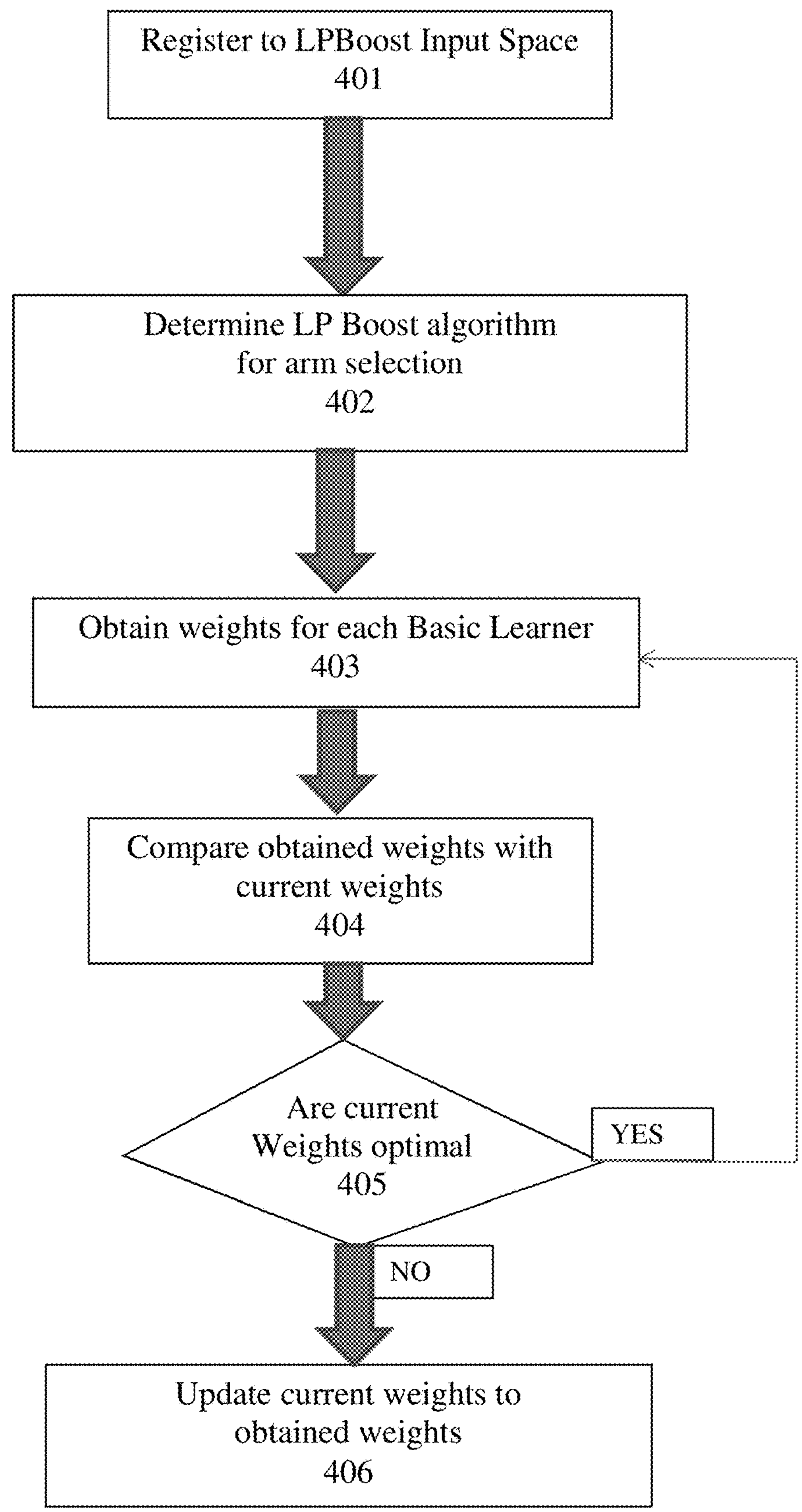
FIG. 4 is a flow chart illustrating a method of optimizing weights for each arm according to an exemplary embodiment.

Next, detailed operations of optimizing weights for each algorithm (operation 304) is described according to an exemplary embodiment with reference to FIG. 4. FIG. 4 is a flow chart illustrating a method of optimizing weights for each arm according to an exemplary embodiment.

1) Registration to LPBoost Input Space

The reward output of basic learners are first to be registered to a [−1, 1] space to be used in LPBoost algorithm, in operation 401. Among basic learners (such as the multi-arm bandit algorithms described above), there are two kinds of reward outputs. If the basic learner is based on linear models, the predicted reward $r_t^a$, t=1, . . . , T, $a \in A_t$ is a regression output. If the basic learner is based on logistic or probability models, the predicted reward $r_t^a$ is a probability between 0 and 1. The following tables provide the transformation needed from estimated rewards by various basic learners (Table 1) and observed rewards (Table 2) to the input for LPBoost.

TABLE 1

Registration of outcome from basic learners to LPBoost input space

| Types of Basic Learners | Registration $r_t^a \rightarrow h_t^a$ |
|---|---|
| Linear Regression Model | $h_t^a = \begin{cases} 1, & \text{when } r_t^a \geq 1 \\ 2r_t^a - 1, & \text{when } 0 < r_t^a < 1 \\ -1, & \text{when } r_t^a \leq 0 \end{cases}$ |
| Logistic/Probit Model | $h_t^a = 2r_t^a - 1$ |

TABLE 2

Registration of observation to LPBoost input space

| Users Action to the recommended arm at time t | Basic Learner $y_t$ | LPBoost $o_t$ |
|---|---|---|
| Recommendation Accepted | 1 | 1 |
| Recommendation Denied | 0 | −1 |

2) A General LPBoost Algorithm for Arm Selection

According to an exemplary embodiment, in operation 402, the classification problem for LPBoost in the personalized recommendation setting can be defined as:

Class 1: All trials with positive user feedback, $o_t^a=1$

Class 2: All trials with negative user feedback, $o_t^a=-1$

Assume there are K basic learners. Let $h_{tk}^a$ denote the predicted reward by a learner k in a trial t for an arm a. That is, a is the arm, t is the number of the iteration, and k is the basic learner algorithm. The LPBoost model is built as follows:

$$f_t^a=\Sigma_{k=1}^K \alpha_t^a \times h_{tk}^a,$$

where $\Sigma_{k=1}^K \alpha_k=1$, and the value of $f_t^a$ shows the belief whether the user will accept arm a if it is recommended. As a result, the following predicted classification is provided by LPBoost, according to an exemplary embodiment:

if $f_t^a \geq 0$, the user is predicted to be in Class 1, that the user will accept the recommendation of arm a.

if $f_t^a<0$, the user is predicted to be in Class 2, that the user will deny the recommendation of arm a.

Accordingly, the LPBoost algorithm will recommend an arm with the maximum belief, so that $$a^*=\text{argmax } f_t^a.$$

The LPBoost algorithm learns optimal weights of basic learners for each arm, in operation 403. The weights, $a_k^a$, are solved by the following linear program, aiming to find a hyperplane to separate the two classes to the largest extend. For each arm a, the following equations are solved:

$$\min_{\alpha,\xi,\rho} \; -\rho + D\sum_{t=1}^{T} \xi_t \tag{1}$$

$$\text{Subject to } o_t \Sigma_{k=1}^K \alpha_k^a h_{tk}^a + \xi_t \geq \rho, t=1,2, \ldots ,T \tag{2}$$

$$\Sigma_{k=1}^H \alpha_k=1, \alpha_k \geq 0, k=1,2, \ldots ,K$$

where $\xi_t$'s are the slack variables and D is a regularization parameter that trades a large margin and a small error penalty and ρ represents the margin to the hyperplane.

For the online recommendation, the input samples may easily reach large scale. At the same time, multiple recommendation algorithms may turn to have zero weights in the LPBoost ensemble, optimal weights determined to be 0 in operation 403 such that these Basic Learners are not used in the arm selection process. As a result, using column generation techniques, which are designed for large linear program, to solve (1). The idea is that it generates primal variables of the linear program iteratively and on-demand. The column generation method chooses the primal variables, also called columns, to generate the problem to be solved while still guaranteeing that the obtained solution is optimal for the original full problem. In this way, only a small fraction of columns has to be created so as to improve the computational efficiency. In this way, column generation techniques can efficiently solve large-scale linear program and have been frequently used in various linear program applications. The column generation technique to LPBoost is formulated as:

For each arm a, the following process is conducted:

Given as input training set: S n←0, no basic learns are selected initially

α←0, all coefficients are 0

β=0, intermedia conditional parameter of dual problem $$\mu=\left(\frac{1}{T}, \ldots, \frac{1}{T}\right),$$

intermedia weights corresponding to optimal dual problem of (1) and (2)

Repeat:

n=n+1

Find basic learners k* so that $\Sigma_{k=1}^K o_t \mu_t^a h_{tk^*}^a=\max_k \Sigma_{k=1}^K o_t \mu_{tk}^a$ Check for optimal solution:

If $\Sigma_{k=1}^K o_t \mu_t^a h_{tk^*}^a \leq \beta$, then n=n−1, break

Add k* to be the n-th selected weak classifier

Solve restricted master for the new cost:

$$(\mu, \beta) \leftarrow \begin{cases} \text{argmin}\,\beta \\ \text{s.t.} \sum_{t=1}^{T} o_t \mu_t^a h_{tk}^a \leq \beta, \; h_{tk}^a \text{ is from the } n \text{ selected weak classifiers} \\ 0 \leq \mu_t \leq D, \qquad t=1, \ldots, T \end{cases}$$

END

α ← the Largrangian multipliers from the last linear programming problem

3) An Online Design of LPBoost Algorithm for Arm Selection

According to an exemplary embodiment, the general LPBoost algorithm for arm selection is able to provide optimal combination of basic learners for large scale settings, where the optimal algorithm operates on entire trial with=1, 2, . . . , T, where T is a positive number. Also, an operational scheme is designed for an online setting scenario, where the optimal solution, when new samples come in, is updated based on the previous optimal solution so that the scale of computation is reduced.

4) Online Learning Near Optimal LPBoost Algorithms

Assume $\alpha_k^a$, k=1, . . . K, is the current optimal weight on arm a for different basic learners. A new sample is input with $(x_{T+1}, o_{T+1}, A_{T+1})$, where $x_{T+1}$, represent the new input information at time T+1; $o_{T+1}$, represent the observed reward at time T+1 registered to LPBoost input space as shown in Table 2; and $A_{T+1}$ is the list of possible arms to be selected at time T+1.

The basic learners are executed using the new sample to obtain: $(x_{T+1}, o_{T+1}, h_{T+1}^a$, a=1, . . . m, k=1, . . . K).

For arm a=1, . . . , m

Check whether the new $h_{T+1,k}^a$, k=1, . . . , K satisfies constraints in equations (2), described above, with the current optimal weights, in operation 404. If yes, (in operation 405=yes), then the current weights are optimal weights for updated inputs and the operations proceed to select the optimal arm using current weights. If not (in operation 405=no), then the dual problem of the linear programming in equations (1), described above, is applied and weights are updated in operation 406. The new dual parameters because of new inputs are set to zero by default, their value is changed to the upper bounds and new primal parameters are calculated accordingly. The values of the new primal parameters are the updated weights by LPBoost.

In an exemplary embodiment, the LPBoost attempts to balance exploitation (providing the art with greatest reward)

and exploration (trying a new arm) as explained in greater detail, according to an exemplary embodiment.

In an exemplary embodiment, the online recommendation engine (model server) maximizes the expected rewards via balancing exploration and exploitation.

For the LPBoost ensemble engine, each basic recommendation algorithm (basic learners such as the ones described above) has its own way to balance between exploration and exploitation. If the list of basic learners used has enough flexibility, then e-greedy, operation 305, as shown in FIG. 3, may be omitted. In an exemplary embodiment, by incorporating basic methods with different parameters such as values $\alpha$ or $q_0$ as provided for example in a multi-arm contextual bandit which uses different tuning parameters such as the value $\alpha$ parameter for the arm or $q_0$ as parameter in Thomson approaches, the LPBoost algorithm learns its final exploration and exploitation balance by setting optimal weights to different balance schemes. In addition, since the weights are updating along with the online recommendation, the exploration and exploitation balance by LPBoost can be learned to be adaptive to the online system. Due to the flexibility of LPBoost to achieve an exploration and exploitation balance, LPBoost is shown to be superior to any basic recommendation algorithm with fixed balance parameter values in the favor of a dynamic online system problem.

On the other hand, according to an exemplary embodiment, when the lists of basic learners do not include sufficient exploration and exploitation balance schemes, an operation 305—ε-greedy method may be added. In an exemplary embodiment, relying on the lists of basic learners in the LPBoost ensemble engine, it is also suggested that an optional ε-greedy method can be used outside LPBoost when the lists of basic learners does not cover sufficient exploration and exploitation balance schemes. In this case, the arm with maximum predicted reward by LPBoost is selected with probability $1-\varepsilon$, and a random arm with selected by probability E. However, when the basic learners are representative to all possible scenarios, the use of ε-greedy method is not necessary.

Accordingly, in an exemplary embodiment, an online personal recommendation system may recommend contents by selecting from various arms e.g., product ads by using basic learners optimized with the LP Boost algorithm such that the best product based on user information and product information is selected. For example, content providers provide five new products for advertisement, product A, B, . . . E. Each product will be considered an arm (a possible ad to present to the user). The model server obtains user profile information such as age, sex, likes and dislikes as well as historical usage data for that user such as observed rewards (what the user has previously purchased, products the user browsed through, and so on). Additionally, the model server may obtain attributes of the product such as product A appeals to ages 20-40, male category product and so on. The model server generates various input parameters for various basic learners such as learners 1, 2, . . . , 5 based on one or more of the obtained user profile information, historical data, and the product attributes. Each basic learner determines a reward value for each product (products A-E) such as a reward value-A-1 (for product A calculated by basic learner 1). For each product, rewards are aggregated using weights determined by LPBoost for each basic learner and an optimal reward value for each product is obtained using a number of basic learners. Accordingly, a more accurate reward prediction is obtained. Further, as the environment (input parameters change), the weights of each algorithm is updated accordingly, as explained in greater detail above. Further, column generation techniques, described above, allow an efficient online updates so that the model/system is more up to date even when environment changes.

In yet another exemplary embodiment, an offline recommendation system is provided. In an exemplary embodiment, the model server collects input parameters beforehand and trains or builds the model based on the collected input parameters. The input parameters are fixed and do not change on the fly.

In yet another exemplary embodiment, each arm may be a resource that needs to be shared among competing projects or users. At the time of initial allocation, the properties, characteristics, attributes of the projections and/or users are only partially known but additional information about characteristics, properties and/or attributes of these projects and/or user may be learned with time. Each resource is then considered an arm and allocation of these resources are determined by the model server such that utilization of each resource is optimized.

Various modifications and variations are possible for one or more exemplary embodiments described above. For example, a system is provided with flexibility regarding input to the model. The system may be configured or may determine on the fly whether or not to use historical information from the history data database 204 and/or how much of the historical data to use, see operations 2 and 3 of FIG. 2. Because the online system may keep evolving, the historical information in the nearby past provide close influence to the recommendation schemes. However, the out of date historical events may mislead the trend for current recommendation preference. In order to select operation 2 or operation 3, possible A/B test can be performed to determine if there has been a significant change in users' preference, as explained above.

When the input data is provided, the data can be a batch or can come as individual inputs, as explained above, depending on the updating rule of the system and the need of frequency to a recommendation system. The batch size can have a broad range since LPBoost with column generation algorithm is able to solve linear programming with very large scales.

In an exemplary embodiment, the LPBoost recommendation engine can be efficiently computed by parallelizing several computations. As shown in FIG. 2, the predicted rewards in the basic learners and the predicted rewards in the LP Boost can use parallel computation, including training different basic learners and use different basic learners to make a reward prediction, and also training LPBoost methods for different arms (parallel via arms) and use LPBoost to predict rewards for different arms in parallel. Thereby, according to an exemplary embodiment, parallelizing these various computations improves computational efficiency.

The descriptions of the various exemplary embodiments have been presented for purposes of illustration, but are not intended to be exhaustive or limited to the embodiments disclosed.

Many changes may be apparent to those of ordinary skill in the art without departing from the scope and spirit of the described exemplary embodiments. The terminology used herein was chosen to best explain the principles of exemplary embodiments, the practical application and/or technical improvement over technologies found in the market place or to enable ordinary skill in the art to understand exemplary embodiments disclosed herein.

In an exemplary embodiment, the online recommendation engine may be implemented on a tangible computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or device.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in one or more programming languages. The program code may be executed on a user terminal device and on a remote computer or server. The remote server may be connected to the user terminal device through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage device either before or after execution by a processor. The instructions may also be downloaded into the computer platform via Internet using a variety of network data communication protocols well known in the art.

The flowchart, the flow diagram, and the block diagram in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Exemplary embodiments were chosen and described in order to explain operations and the practical applications thereof, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different exemplary embodiments discussed above may be combined into a single embodiment. Conversely, some of the features of a single exemplary embodiment discussed above may be deleted from the exemplary embodiment. Therefore, the present disclosure is not intended to be limited to exemplary embodiments described herein but is to be accorded the widest scope as defined by the features of the claims and equivalents thereof.

What is claimed is:

1. A method of recommending content comprising:

based on a user at least one of hovering over, clicking on or viewing displayed content or purchasing a product, identifying, by a computer system, a user interaction that indicates that the user interacted with the displayed content or the product;

identifying, by the computer system, as a contextual feature input by the user, a particular category of the displayed content or the product;

assigning, by the computer system, an interaction value for the particular category based on a level of the user interaction;

obtaining, by the computer system, arm specific contextual input information, wherein the arm specific contextual input information includes a plurality of arms, and each of the plurality of arms includes at least one of a product characteristic, a product attribute, or a particular content that is to be recommended;

applying, by the computer system, the identified user interaction to each of the plurality of arms using a plurality of different individual recommendation algorithms such that a plurality of user interaction values are generated by the plurality of different individual recommendation algorithms for the user interaction, based on the contextual feature input by the user, wherein the plurality of different individual recommendation algorithms comprise at least three selected from among a group comprising a linear multi-arm bandit algorithm, a logistic multi-arm bandit algorithm, a probability multi-arm bandit algorithm, and a non-contextual bandit algorithm;

calculating, by the computer system, using a parallel computing scheme, an aggregated user interaction value for each of the plurality of arms by applying linear program boosting to the user interaction values for the respective arm by using an LPBoost recommendation engine, wherein the LPBoost recommendation engine trains the arm selection algorithms so that an expected reward is maximized, and the LPBoost recommendation engine trains basic learners, uses different basic learners to make a reward prediction, trains LPBoost methods for different parallel arms, and uses LPBoost to predict rewards for different arms in parallel, wherein each model of the contextual bandit algorithms is updated for each of the plurality of arms in parallel in the basic learners component, based on the updated historical samples and input contextual features, and using the updated model, rewards for each arm are then predicted;

selecting, by the computer system, an arm from the plurality of arms which has a greatest calculated aggregated user interaction value;

identifying, by the computer system, whether the selected arm is sufficient by at least one of: comparing the selected arm with an optimal arm, comparing the selected arm with a predetermined threshold, or applying a yield algorithm to identify whether the optimal arm is statistically probable to yield a positive user interaction;

if the selected arm is identified to be sufficient, obtaining, by the computer system, content to recommend to the user that corresponds to the selected arm, and providing, by the computer system, the obtained content corresponding to the selected arm to the user; and if the selected arm is identified to not be sufficient, providing, by the computer system, content of a new category based on already known user preferences such that randomness is created, and obtaining, by the computer system, user feedback regarding the new category so as to improve algorithm training.

2. The method according to claim 1, wherein the providing the content corresponding to the selected arm comprises:

obtaining, by the computer system, the content corresponding to the selected arm from a content provider server; and causing, by the computer system, a display of the computer system to display the obtained content corresponding to the selected arm.

3. The method according to claim 2, wherein the displayed content comprises at least one of an image, a video, or an audio related to an advertisement of an entity or an item.

4. The method according to claim 1, wherein the level of the user interaction with the content displayed on the display corresponds to a level of involvement with the displayed content.

5. The method according to claim 1, wherein the calculating the aggregated user interaction value for the each of the plurality of arms comprises identifying a weight for each of the user interaction values calculated by the respective individual recommendation algorithms and calculating the aggregated user interaction value by applying the identified weight to each of the user interaction values.

6. The method according to claim 1, further comprising:

selecting the arm by applying an $\varepsilon$-greedy method, where the selected arm has a probability of $1-\varepsilon$ and a new arm has a probability of $\varepsilon$; and outputting the content that corresponds to the selected arm, wherein the new arm is a randomly selected arm that is different from the plurality of arms.

7. The method according to claim 1, wherein each of the plurality of arms is an arm that corresponds to a different contextual content.

8. The method according to claim 1, wherein the contextual feature input by the user is updated based on a change of environment which comprises at least one of a change in user behavior or a change in contents available.

9. The method according to claim 1, further comprising identifying an amount of the historical user interaction data to include in the calculating of the user interaction values based on environmental factors which comprise at least one of attributes in a user profile or a user behavior pattern.

10. A computer system of recommending content comprising:

a memory that stores computer executable instructions; and a processor configured to execute the stored instructions, which when executed by the processor, cause the processor to:

based on a user at least one of hovering over, clicking on or viewing displayed content or purchasing a product, identify a user interaction that indicates that the user interacted with the displayed content or the product;

identify, as a contextual feature input by the user, a particular category of the displayed content or the product;

assign an interaction value for the particular category based on a level of the user interaction;

obtain arm specific contextual input information, wherein the arm specific contextual input information includes a plurality of arms, and each of the plurality of arms includes at least one of a product characteristic, a product attribute, or a particular content that is to be recommended;

apply the identified user interaction to each of the plurality of arms using a plurality of different individual recommendation algorithms such that a plurality of user interaction values are generated by the plurality of different individual recommendation algorithms for the user interaction, based on the contextual feature input by the user, wherein the plurality of different individual recommendation algorithms comprise at least three selected from among a group comprising a linear multi-arm bandit algorithm, a logistic multi-arm bandit algorithm, a probability multi-arm bandit algorithm, and a non-contextual bandit algorithm;

calculate, using a parallel computing scheme, an aggregated user interaction value for each of the plurality of arms by applying linear program boosting to the user interaction values for the respective arm by using an LPBoost recommendation engine, wherein the LPBoost recommendation engine trains the arm selection algorithms so that an expected reward is maximized, and the LPBoost recommendation engine trains basic learners, uses different basic learners to make a reward prediction, trains LPBoost methods for different parallel arms, and uses LPBoost to predict rewards for different arms in parallel, wherein each model of the contextual bandit algorithms is updated for each of the plurality of arms in parallel in the basic learners component, based on the updated historical samples and input contextual features, and using the updated model, rewards for each arm are then predicted;

select an arm from the plurality of arms which has a greatest calculated aggregated user interaction value;

identify whether the selected arm is sufficient by at least one of: comparing the selected arm with an optimal arm, comparing the selected arm with a predetermined threshold, or applying a yield algorithm to identify whether the optimal arm is statistically probable to yield a positive user interaction;

if the selected arm is identified to be sufficient, obtain content to recommend to the user that corresponds to the selected arm, and provide the obtained content corresponding to the selected arm to the user; and if the selected arm is identified to not be sufficient, provide content of a new category based on already known user preferences such that randomness is created, and obtain user feedback regarding the new category so as to improve algorithm training.

11. The apparatus according to claim 10, further comprising a display, wherein the providing the content corresponding to the selected arm comprises:

obtaining the content corresponding to the selected arm from a content provider server; and the display displaying the obtained content corresponding to the selected arm.

12. The apparatus according to claim 11, wherein the displayed content comprises at least one of an image, a video, or an audio related to an advertisement of an entity or an item.

13. The apparatus according to claim 10, wherein the level of the user interaction with the content displayed on the display comprises a level of involvement with the displayed content.

14. The apparatus according to claim 10, wherein the calculating the aggregated user interaction value for the each of the plurality of arms comprises identifying a weight for each of the user interaction values calculated by the respective individual recommendation algorithms and calculating the aggregated user interaction value by applying the identified weight to each of the user interaction values.

15. The apparatus according to claim 10, wherein the processor is further configured to:

select the arm by applying an ε-greedy method, where the selected arm has a probability of 1−ε and a new arm has a probability of ε; and output the content that corresponds to the selected arm, and the new arm is a randomly selected arm that is different from the plurality of arms.

16. The apparatus according to claim 10, wherein each of the plurality of arms is an arm that corresponds to a different contextual content, and the contextual feature input by the user is updated based on a change of environment which comprises at least one of a change in user behavior or a change in contents available.

17. A non-transitory computer readable medium storing computer readable instructions, which when executed by the computer cause computer to:

based on a user at least one of hovering over, clicking on or viewing displayed content or purchasing a product, identify a user interaction that indicates that the user interacted with the displayed content or the product;

identify, as a contextual feature input by the user, a particular category of the displayed content or the product;

assign an interaction value for the particular category based on a level of the user interaction;

obtain arm specific contextual input information, wherein the arm specific contextual input information includes a plurality of arms, and each of the plurality of arms includes at least one of a product characteristic, a product attribute, or a particular content that is to be recommended;

apply the identified user interaction to each of the plurality of arms using a plurality of different individual recommendation algorithms such that a plurality of user interaction values are generated by the plurality of different individual recommendation algorithms for the user interaction, based on the contextual feature input by the user, wherein the plurality of different individual recommendation algorithms comprise at least three selected from among a group comprising a linear multi-arm bandit algorithm, a logistic multi-arm bandit algorithm, a probability multi-arm bandit algorithm, and a non-contextual bandit algorithm;

calculate, using a parallel computing scheme, an aggregated user interaction value for each of the plurality of arms by applying linear program boosting to the user interaction values for the respective arm by using an LPBoost recommendation engine, wherein the LPBoost recommendation engine trains the arm selection algorithms so that an expected reward is maximized, and the LPBoost recommendation engine trains basic learners, uses different basic learners to make a reward prediction, trains LPBoost methods for different parallel arms, and uses LPBoost to predict rewards for different arms in parallel, wherein each model of the contextual bandit algorithms is updated for each of the plurality of arms in parallel in the basic learners component, based on the updated historical samples and input contextual features, and using the updated model, rewards for each arm are then predicted;

select an arm from the plurality of arms which has a greatest calculated aggregated user interaction value;

identify whether the selected arm is sufficient by at least one of: comparing the selected arm with an optimal arm, comparing the selected arm with a predetermined threshold, or applying a yield algorithm to identify whether the optimal arm is statistically probable to yield a positive user interaction;

if the selected arm is identified to be sufficient, obtain content to recommend to the user that corresponds to the selected arm, and provide the obtained content corresponding to the selected arm to the user; and if the selected arm is identified to not be sufficient, provide content of a new category based on already known user preferences such that randomness is created, and obtain user feedback regarding the new category so as to improve algorithm training.

* * * * *